May 17, 1932.  B. B. RAMEY  1,858,459
PORTABLE CUTTING TOOL
Filed Jan. 3, 1930   3 Sheets-Sheet 1
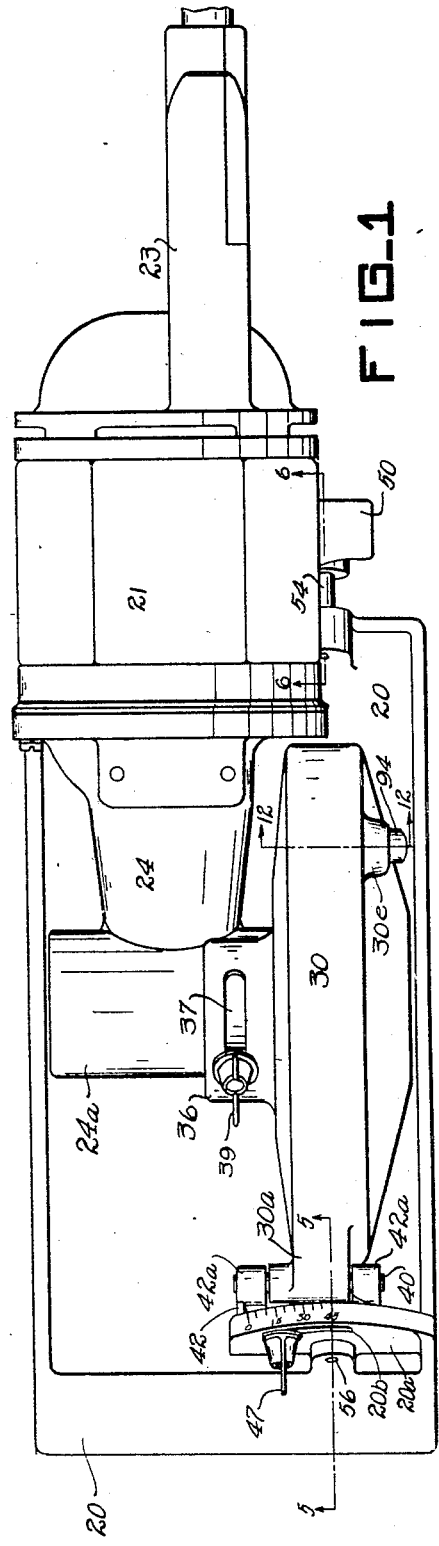
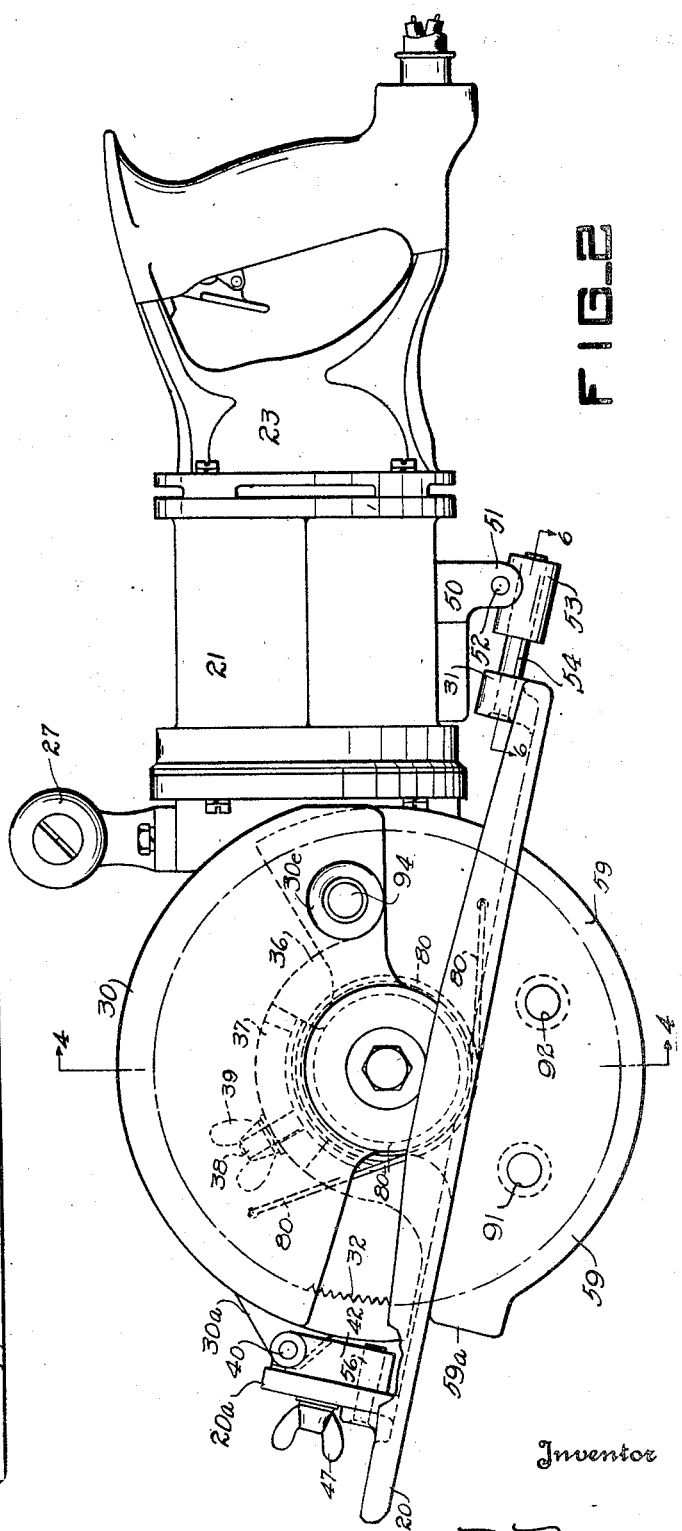

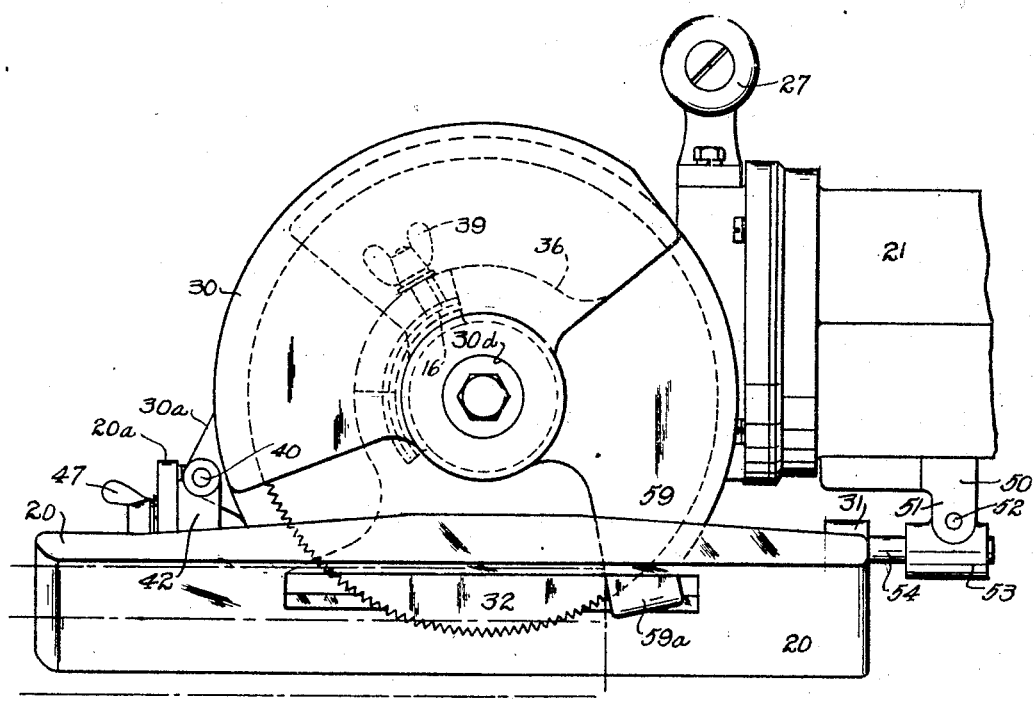
FIG_3
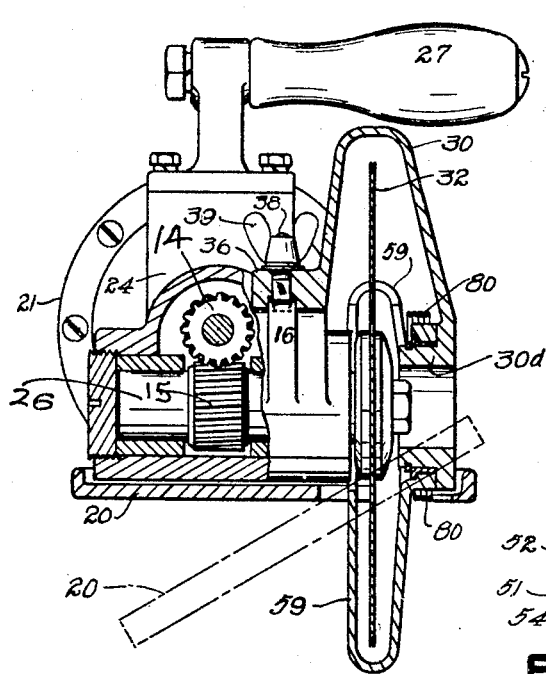
FIG_4
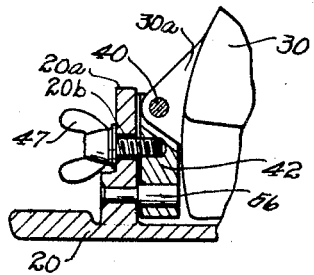
FIG_5
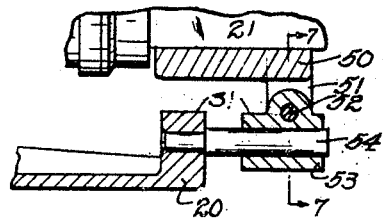
FIG_6
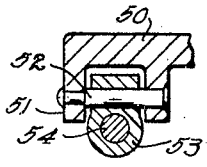
FIG_7
Inventor
Blaine B. Ramey
By Bates Golnick & Pearne
Attorneys

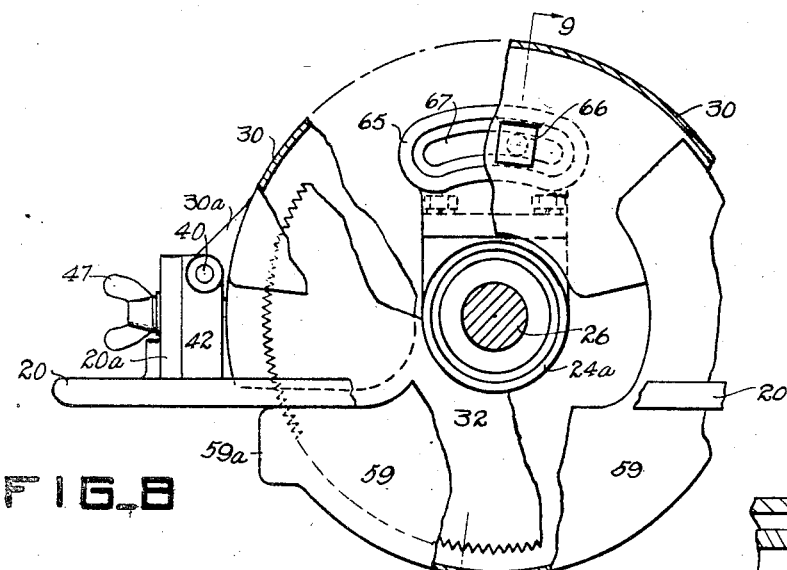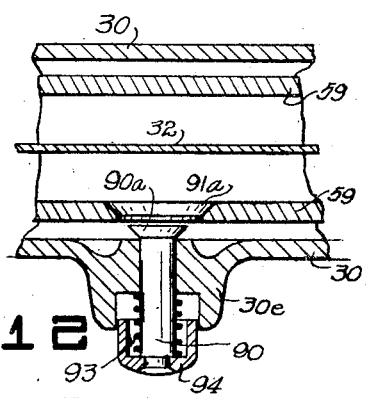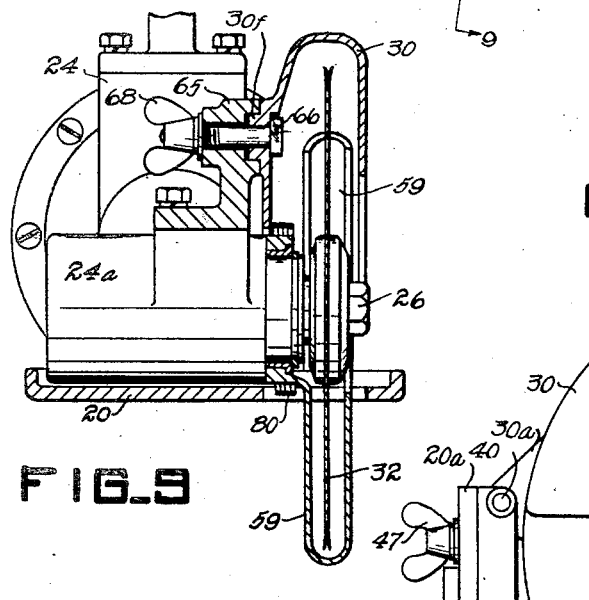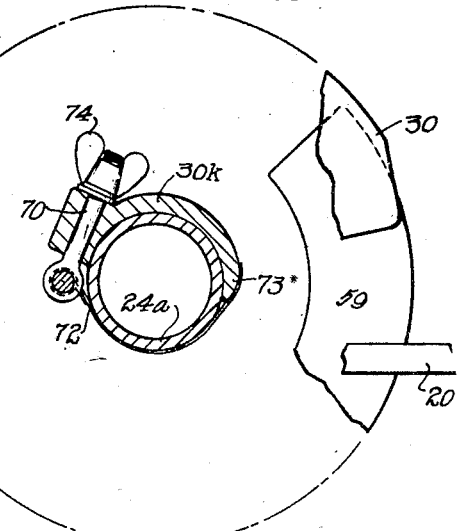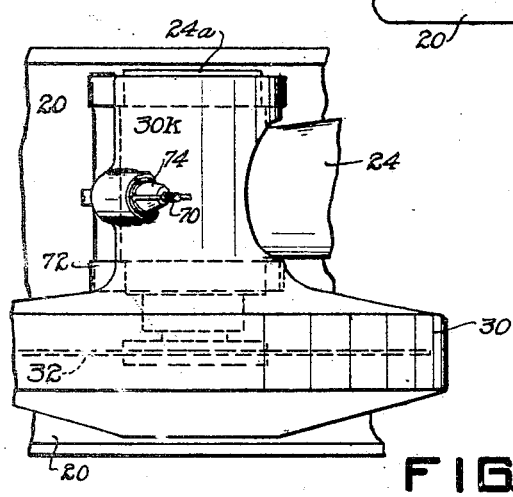

Patented May 17, 1932

1,858,459

UNITED STATES PATENT OFFICE

BLAINE B. RAMEY, OF STONELEIGH, MARYLAND, ASSIGNOR TO THE BLACK & DECKER MANUFACTURING COMPANY, OF TOWSON, MARYLAND, A CORPORATION OF MARYLAND

PORTABLE CUTTING TOOL

Application filed January 3, 1930. Serial No. 418,267.

This invention is concerned with portable power driven tools, and more particularly, electrically-powered portable saws, and the general object thereof is to provide a saw construction which will be mechanically simple, sufficiently powered while being sturdy and light in weight, and properly balanced for convenient manual manipulation, whereby the cutting element can be rapidly advanced into the work being cut.

More specifically, my invention is concerned with the provision of an electrically driven portable saw construction affording a device which may be readily adjusted to any depth of cut desired within the cutting limitations of the tool, and which may be adjustable for mortise, bias and angle cutting.

A still further object of my invention is the provision of an electrically driven portable saw having the foregoing characteristics, and in addition thereto an arrangement for protecting the operator against injury by the rotating element.

Other objects of my invention will hereinafter become apparent from the following description which refers to the accompanying drawings. The drawings illustrate several embodiments of my invention, and the essential characteristics thereof are summarized in the claims.

In the drawings, Fig. 1 is a plan view of an electrically driven portable saw embodying the features of my invention; Fig. 2 is a side elevational view of the same; Fig. 3 is a side elevational view of the device with certain of the elements thereof adjusted to a position different than that of the elements as illustrated in Fig. 2; Fig. 4 is a cross sectional end elevation taken through the device substantially along the line 4—4 of Fig. 2; Figs. 5 and 6 are fragmentary cross sectional detail views taken along lines 5—5 and 6—6 of Fig. 1; Fig. 7 is a cross sectional detail of a pivot joint taken along line 7—7 of Fig. 6; Fig. 8 is a fragmentary side elevational view of an electrically driven portable saw embodying a modified form of my invention; Fig. 9 is a cross end elevation taken substantially along line 9—9 of Fig. 8; Figs. 10 and 11 are fragmentary views showing still another embodiment of my invention, and Fig. 12 is a cross sectional fragmentary view of a saw guard retaining means and taken substantially along the line 12—12 of Fig. 1.

My invention contemplates an electrically driven portable saw construction which may be embodied in a practical design and which can be manually operated by the user thereof in a convenient manner through considerable periods without causing undue exertion and corresponding fatigue on the part of the operator. Tools of this general character are required to have some means embodied therein which will permit a ready adjustment of the rotary saw disc relative to a base or shoe which slides over the work, and which supports the entire tool relative to the work, and in addition thereto a readily adjustable means which will permit the positioning of the shoe or base of the tool at an angle to the axis of the rotary cutter whereby bias, mortise and angle cuts may be effected.

In Figs. 1 to 7 inclusive of the drawings I show one embodiment of my invention wherein a base plate or shoe 20 comprises the support for the device and the under surface of this member is adapted to slide over the surface of the work being cut. This base member is pivotally attached to a frame structure which supports the motor, a saw spindle or shaft transverse to the motor shaft and suitable reduction gearing. The saw disc extends through an opening formed in the base or shoe and the frame of the device and the base are relatively angularly adjustable about a longitudinal axis which is disposed substantially within the cutting plane of the saw disc. As shown in the drawings, a motor casing 21 is provided of sufficient stability to comprise part of the main frame on the tool. One end of this casing member has attached thereto a vertical grip handle structure 23. The other end of the casing may have attached thereto a frame member 24, which comprises a housing for reduction gears 14 and 15, and also a supporting medium for bearing members which support the saw spindle 26 (see Fig. 4). A second handle member 27 is attached to the frame member 24 at the top thereof and extends in a horizontal direction at a convenient height, whereby the operator may wield the tool with manual convenience.

The base member 20 is respectively attached to the frame members 24 and 21 through a saw disc shield or cover 30, and a double pivot construction generally indicated at 31 in Fig. 2 is provided in such manner that a longitudinal adjusting axis is obtained between the frame of the tool and the base member 20, which axis lies substantially in a plane coincident to the plane of cut of the saw disc 32, whereby the base 20 may be angularly adjusted relative to the plane of the saw disc.

The mechanical nature of the connection between the base and the frame is such that the saw shield or hood 30 may be annularly adjusted about the saw axis and accordingly about the cylindrical portion 24a of the frame member 24 to cause the base member 20 to be swung about a pivot pin 52 to any desired position within the depth cutting range of the saw disc 32.

Such depth cut determining means will now be described in detail. The shield or hood member 30 is provided with an annular hub portion 36 suitably fitted to the portion 24a of the frame member 24; note the tongue and groove connection as shown at 16 in Fig. 4. The hub portion 36 has a slot 37 formed therein through which extends a stud member 38 fixed to the frame portion 24a and suitably threaded to receive a wing nut 39, the latter serving to firmly bind the hub portion 36 of the saw shield or hood 30 to the frame member 24 in a convenient and rigid manner. Upon the outer end of the saw shield member 30 I provide a lug 30a, suitably bored to receive a forward pivot pin 40 which extends through bearing portions 42a formed on a member 42 which is operatively disposed between an arcuately formed lug 20a extending upwardly from the member 20 and the shield 30. The lug 20a (see Figs. 2 and 5) has formed therein an arcuate slot 20b through which extends a wing screw 47 to bind the member 42 to the base in a rigid manner whereby the base can be held at any desired angle relative to the plane of cut of the saw disc 32 but within the limitations of 45°.

The inner end of the base is connected to the underside of the frame member 21, and the latter is provided with a bracket formation 50 (see Figs. 2, 6 and 7). The bracket 50 has bifurcated portions 51 suitably bored to receive the transversely extending pin 52 which pin also passes through a pivot bearing member 53. The latter member is bored longitudinally relative to the saw disc to receive a stud 54 suitably secured to the inner end of the base member 20 at a position in alignment with a forward pivot pin 56 which is rigidly fixed to the bracket portion 20a.

At the forward end of the base the stud 56 extends through a suitable bore formed in the intermediate member 42 whereby the base can be swung about the stud members 56 and 54 for bias cut adjustment of the base relative to the saw disc.

It will thus be seen that the base 20 may be swung about the transverse pivot pin 52 by loosening the wing nut 39 and shifting the shield 30, thus causing the base 20 to be swung upwardly or downwardly as desired. It will be noted that the pivot pin 54 is permitted to shift longitudinally in the member 53 during such depth cut adjustment. The base is shown in Fig. 3 as being swung to one of the angular positions within the range of bias cut adjustments.

If desired, a swinging guard 59 may be provided in telescopic relation to the saw shield member 30, and this guard may be mounted upon one end of the portion 24a of the frame member 24 as shown in Fig. 9, or as shown in cross section in Fig. 4, this guard may be mounted upon an inwardly extending hub portion 30d formed on the shield member 30, whereby the guard can be swung annularly about the axis of the saw disc in an automatic manner when the implement is brought into contact with the work and the nose portion 59a engages the edge of the stock being cut. A resilient means in the form of a spring member 80 is concentrically disposed about the saw axis and attached in a convenient manner to maintain the cover in closed position when the saw disc is not cutting.

I provide means for maintaining the guard 59 in telescoped relation to the shield 30 whereby the tool may be conveniently utilized for depth cutting anywhere on the surface of the work and this means may comprise a plunger 90 (see Figs. 1, 2 and 12) disposed within a transversely extending base formed in a base portion 30e, provided on the shield 30, which plunger may engage the guard 59 in suitably disposed annularly aligned openings 91 and 92. The inner end of the plunger 90 is provided with an inverted coniform head 90a, which locks with a complementary surface 91a formed about the perimeters of the openings 91 and 92. whereby the plunger head may lock therewith. A spring 93 is disposed in a counterbase formed concentric of the plunger base to react against the shield 30 and a finger cap 94 comprising the exposed outer end of the plunger. The plunger is thus normally maintained in a non-engaging position by the spring. When it is desired to release the plunger from the cover, the cover is normally turned slightly against the influence of the cover spring 80, thus permitting the plunger spring 93 to withdraw the plunger from cover engaging position. It will be noted that the location of the guard openings 91 and 92 are such that the top hole can be utilized when the shield 30 and base are adjusted to maximum depth cutting gage and the other opening may be utilized when the shield and base are adjusted to minimum depth cutting gage.

In Figs. 8 and 9 I show a modified form of my invention wherein the saw shield 30 is provided with an arcuate interlocking portion 30f, which is fitted into a corresponding slot formed in a bracket member 65, the latter being suitably secured to the portion 24a of the frame member 24 (see Fig. 9). A clamping bolt 66 extends through an opening formed in the shield 30, at a position whereby the bolt will align with an arcuate slot 67 (see Fig. 8) formed in the bracket member 65. A wing nut 68 is provided for conveniently effecting the clamping of the shield member 30 to the bracket member 65. The pivotal connections between the base member 20 and the saw shield member 30 and the frame member 21 are the same as have hereinbefore been described, and it will be apparent that annular adjustment of the shield 30 will effect the raising or lowering of the base member 20 relative to the saw disc. In this construction, the guard 59 is shown as being revolubly mounted upon one end of the cylindrical portion 24a of the frame member 24.

In Figs. 10 and 11 I show still another means for adjustably attaching the saw shield member 30 to the cylindrical portion 24a of the frame member 24, and which may comprise an annular hub portion 30k formed on the shield 30 to receive a clamping bolt 70, to one end of which is attached a flexible band 72, the band being secured at 73 to the hub portion 30k, whereby tightening of a wing nut 74 on the upper end of the bolt 70 will cause the saw shield member 30 to be frictionally clamped to the cylindrical portion 24a of the frame member 24.

It will be apparent from the foregoing descriptions of my invention that I obtain a portable, electrically powered cutting implement which can be manually manipulated conveniently, and the characteristics of the parts are such that a tool of sufficient power can be manufactured within desired weight limitations without sacrificing the characteristic of sturdiness, and the depth and angle adjustments of the shoe or base can be readily effected.

I claim:—

1. In a motor driven portable cutting tool, the combination of a rotary disc cutter, a motor, a frame therefor, a speed reduction mechanism associated with the motor and supported by an extension of the motor frame and adapted to drive the cutter, and means for determining the depth cutting range of the cutter, said means, motor, and speed reduction mechanism being supported by a frame structure including a guard for protecting the operator of the tool from the cutter, said guard being angularly adjustable about the axis of the cutter and connected to said depth cut determining means and an adjustable pivot mechanism interposed between the frame and guard and said depth determining means for adjustably shifting said last named means toward and from the cutter axis and about a longitudinal axis, transverse to the cutter axis.

2. In a motor driven portable cutting tool, the combination of a material cutter, a frame structure operatively supporting the cutter, and means for determining the cutting depth of the cutter and the plane of the cut to be effected by the cutter, and a cutter shield for protecting the operator of the tool from the cutter, said shield being adjustable about the axis of the cutter and connected to said depth cut determining means at a point remote from the axis of the cutter whereby adjustments of the shield will determine the extent of the depth cut effected by the cutter.

3. In a portable, electrically powered saw, a motor frame and associated frame work for operatively supporting a saw disc, a work contacting shoe, a saw disc shield mounted on said associated frame work, pivot means connecting said shoe to the shield and a shoe connecting mechanism comprising in effect a universal joint for connecting the shoe to the motor frame, and a revoluble disc cover telescopically arranged relative to said disc shield.

4. In a portable electrically powered saw, frame work adapted to support a motor and reduction gearing, a work contacting shoe, a saw disc driven by the motor, a saw shield adjustably mounted on said frame work for rotation about an axis substantially coinciding with the axis of the disc and connected to said shoe at a point remote from the axis of the disc through adjustable connecting mechanism comprising in effect a universal joint.

5. In a motor driven portable cutting tool, the combination of a material cutter, a motor and speed reduction mechanism associated with the motor for driving the cutter, means for determining the cutting depth of the cutter, a cutter shield for protecting the operator of the tool from the cutter, a revoluble guard associated with the shield a plunger adapted to interconnect the guard and shield for maintaining the guard inoperative at will, and means for normally holding said plunger in disconnected position.

6. In a portable, electrically powered saw, a motor frame and associated frame work for operatively supporting a saw disc, a work contacting shoe, a saw disc shield mounted on said associated frame work, pivot means connecting said shoe to the shield and a shoe connecting mechanism comprising in effect a universal joint for connecting the shoe to the motor frame, a revoluble disc cover telescopically arranged relative to said disc shield, and an interconnecting means mounted upon the shield for preventing relative movement between the cover and shield when desired.

7. In a portable, electrically powered saw, a motor frame and associated frame work for operatively supporting a saw disc, a work contacting shoe, a saw disc shield mounted on said associated frame work, pivot means connecting said shoe to the shield and a shoe connecting mechanism comprising in effect a universal joint for connecting the shoe to the motor frame.

8. In a motor driven portable cutting tool, the combination of a frame, a motor supported by said frame, a cylindrical housing on the frame, reduction gearings within said housing, means connecting the motor to said gearing, a saw disc, means connecting the gearing with said saw disc, a semi-cylindrical saw shield having an arcuate hub, means for securing the hub on the saw shield in adjustable position about the cylindrical housing, a work contacting shoe pivoted at one end to the frame and at the other end to the saw shield, said shoe having an opening therein to receive the saw disc, whereby the depth of cut can be varied by adjusting the shield in its position about the cylindrical housing.

9. In a motor driven portable cutting tool, the combination of a frame, a cutter journalled in said frame, a motor carried by the frame for driving the cutter, a universal connection between the base plate and the frame, a cutter guard adjustable about the cutter axis, a universal connection between the base plate and said cutter guard, one of said universal connections embodying a lost motion connection whereby the depth of cut can be varied by movement of the cutter guard about the cutter axis.

10. In a motor driven portable cutting tool, the combination of a frame, a saw disc journalled in said frame, a motor carried by the frame, for driving the saw disc, a work contacting shoe pivoted at one end to the frame, a pair of telescopic guards for the saw disc revolvably mounted to the frame, means to secure one of said guards in selective position about the saw disc axis, said guard being pivotally connected to said work contacting shoe at a point remote from the saw disc axis, whereby movement of said guard about the saw disc axis moves the shoe toward and away from said saw disc axis.

11. In a motor driven portable tool, the combination of a frame, a cutter journalled in said frame, a cutter shield for protecting the operator of the tool from the cutter, said shield being adjustable about the axis of the cutter and means for determining the cutting depth of the cutter, said means including a work engaging shoe pivotally mounted to the frame at one end and pivotally connected to the cutter shield at the other end.

12. In a motor driven portable cutting tool, the combination of a frame, a saw disc journalled in said frame, a guard for said saw disc revolvably mounted to the frame about the saw disc axis, securing means for the guard for holding it in a plurality of adjusted positions with relation to the frame, and means for determining the depth of cut and angle of cut, said means comprising a work-engaging shoe universally mounted to the frame at one end thereof and universally mounted to the saw guard at the other end thereof, there being means for holding the shoe in any of its adjusted positions about an axis transverse to the cutter axis.

In testimony whereof, I hereunto affix my signature.

BLAINE B. RAMEY.